United States Patent [19]

Perlot

[11] Patent Number: 5,566,971
[45] Date of Patent: Oct. 22, 1996

[54] VEHICLE AIR SUSPENSION SYSTEM

[75] Inventor: Gordon R. Perlot, Brownsville, Oreg.

[73] Assignee: Safari Motor Coaches, Inc., Harrisburg, Oreg.

[21] Appl. No.: 508,036

[22] Filed: Jul. 27, 1995

[51] Int. Cl.⁶ .................................................. B60G 11/26
[52] U.S. Cl. ........................ 280/711; 280/678; 267/256
[58] Field of Search ..................... 280/211, 678, 280/688, 202; 267/256, 31

[56] References Cited

U.S. PATENT DOCUMENTS

| | | | |
|---|---|---|---|
| 3,315,979 | 4/1967 | Chalmers | 280/678 X |
| 4,687,222 | 8/1987 | Chalmers | 280/678 |
| 5,016,905 | 5/1991 | Licari | 280/678 X |
| 5,039,124 | 8/1991 | Widmer | 280/211 |
| 5,433,287 | 7/1995 | Szalai et al. | 280/211 X |

FOREIGN PATENT DOCUMENTS 0866121  4/1961  United Kingdom ............... 280/678

*Primary Examiner*—Christopher P. Ellis
*Attorney, Agent, or Firm*—Robert L. Harrington

[57] ABSTRACT

An air suspension system for a motor home wherein a frame supports a body and the suspension system supports the frame relative to the axles of the motor home. A structure at the front and rear ends over the axles includes arm portions extended laterally of the frame for supporting the air bags. The position of the air bags is established to substantially maximize the air bag expansion at a determined maximum road deviation to be encountered by the motor home.

3 Claims, 2 Drawing Sheets

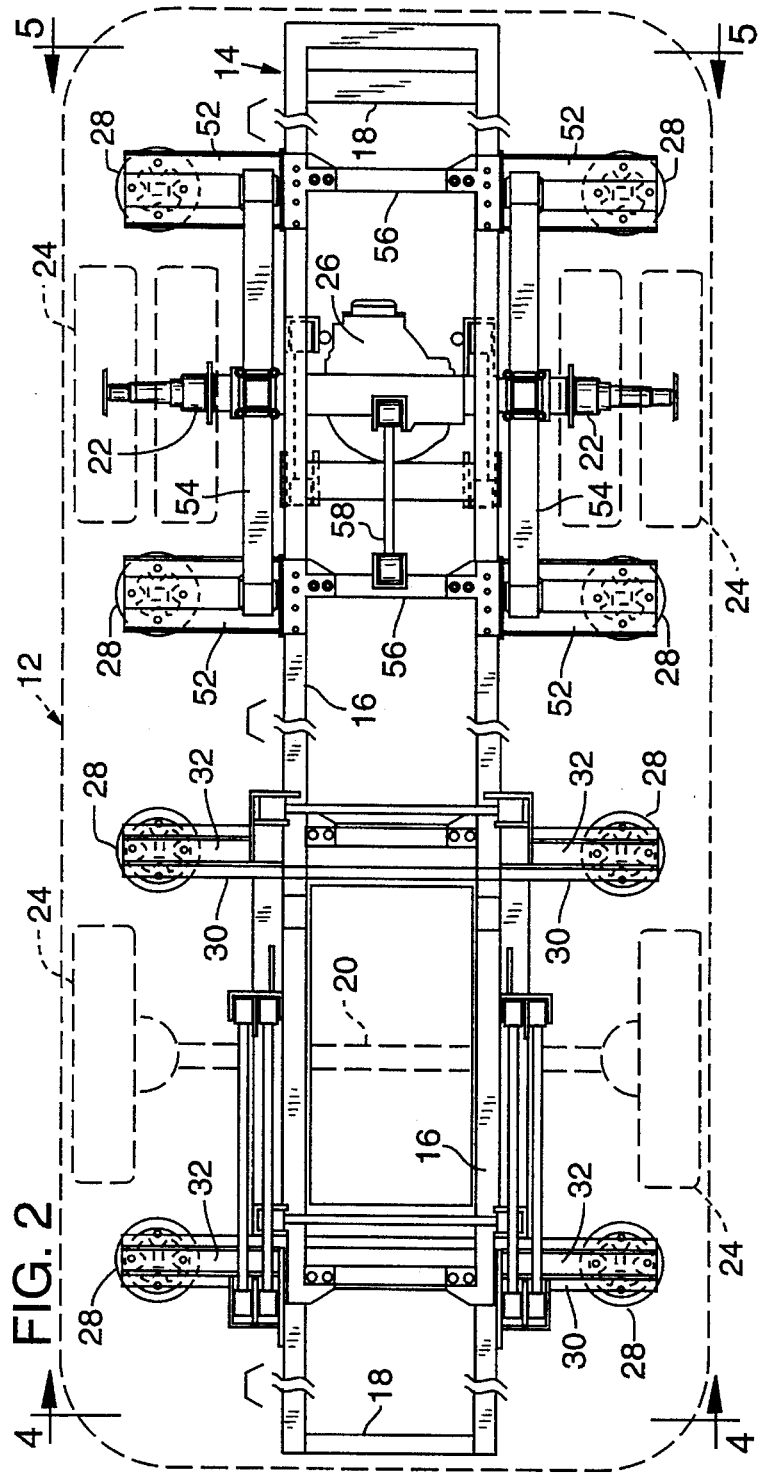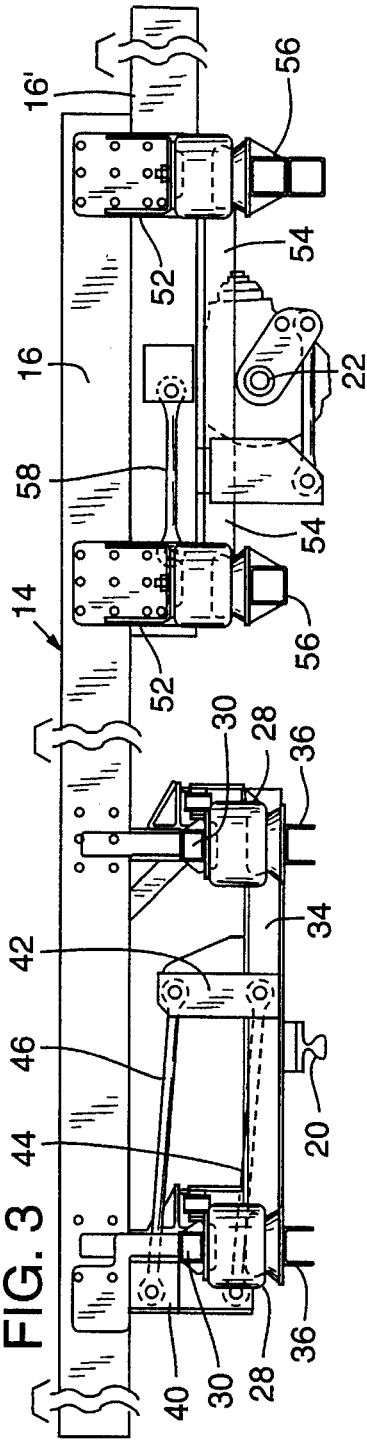

VEHICLE AIR SUSPENSION SYSTEM

FIELD OF THE INVENTION

This invention relates to an air suspension system for the chassis of a vehicle and more particularly for a vehicle such as a motor home wherein the body of the vehicle is substantially wider than its frame.

BACKGROUND OF THE INVENTION

The chassis of a vehicle substantially consists of front wheels (steering wheels) interconnected by a front axle, rear wheels (driving wheels) interconnected by a rear axle, and a frame supported on the axles and connecting the front and rear axles. A body is rigidly attached to the frame and in the case of most motor homes, the body is substantially wider than the frame and extends in width past the wheel width.

The frame and body are substantially non-flexible and will not accommodate twisting. Yet the vehicle is driven over road surfaces that are not level. Thus, whereas the axles are designed to be coplanar with the wheels resting on a level surface, the axles constantly change in angular relationship as the vehicle travels over the road surface. A suspension system interposed between the frame and axle is intended to accommodate the angular change of the axles.

One form of suspension system is an air suspension system. An air bag is pivotally placed at each of the four intersections whereat the two side rails of the rectangular frame cross over the two axles. Thus, the frame (and body) are supported on four air bags. Each bag is under air pressure (e.g., the front bags are under 45 PSI and the rear bags are under 65 PSI). The bags will expand when the frame is lifted away from the axles and they will compress when added weight is applied to compress the frame toward the axle. The bags are necessarily designed to restrict the amount of expansion and contraction and thus the permitted change in distance between the frame and axles at the positions of the bags.

As the vehicle travels down the road, a front wheel (and then the rear wheel) may encounter a dip (hole) or a rise (bump) in the road and in either event the front axle is skewed relative to the rear axle (or vice versa). Assuming a dip in the road surface that is engaged by the right front wheel, the right front wheel drops down and the front axle is angularly shifted downwardly left to right. Both the front bags (assuming they are inwardly of the wheels) drop down, the right bag more than the left. Thus, the front end of the frame and body drop down at least to the lowered position of the left bag. Dynamics dictate that the frame and body will then tilt toward the right front bag and this sets up an undesired rocking of the body. Nevertheless, the interaction of the bags allows the frame and body attached thereto to avoid a twisting force as would otherwise be urged upon the frame and body when one of the axles is angularly deflected relative to the other axle.

The above describes generally the function of the air bags but the reader should understand that other structural features of the vehicle affect the relative movement between the axles and frame. Shock absorbers dampen or resist the shifting of the frame relative to the axles and reduces the rocking effect that occurs as the vehicle travels over small rises and dips in the roadway. However, even the reduced rocking when applied to a motor home causes discomfort. The frame of a motor home is substantially more narrow than the wheel width and the body width of the motor home. Whatever deflection occurs at the inner position of the air bag, i.e., located under the frame rails, that deflection is magnified at the side edges of the body which overhangs the bag position and a slight rocking effect at the bag position turns into a more severe rocking or tipping effect experienced by the passengers of a motor home.

Furthermore, it is believed that the overhang produces a lever effect and the force differential as applied to the bags is increased. Thus, what might be a small deflection as between the axles produces a more severe force differential as applied to the air bags and that differential produces greater rocking than necessary to accommodate the axle deflection.

In addition to the added width, a motor home is tall. The floor of the motor home is built over the chassis and the ceiling height must accommodate a six-foot plus person. The total height, road to roof, will likely exceed ten feet. The center of gravity is thus higher than in other vehicles and centrifugal force when rounding curves will urge tipping. The air bag at the outside position is a pivot about which the centrifugal force is directed. Tipping or tilting is increased as the pivot is moved inwardly under the center of gravity and with the bags located under the frame, the typical motor home incurs considerable and undesirable tipping when rounding a curve. High winds directed crossway to the direction of travel create a similar problem.

It is known that one motor home manufacturer attempts to reduce the undesired rocking by simply positioning the bags at the extreme side edges of the body. The frame and body are made extra strong and are structurally integral one with the other. The bags allow a certain degree of angular deflection of the axles relative to the frame and body but rocking or tipping is substantially reduced. Whereas this modification reduces the rocking motion, the vehicle offers a smooth ride on relatively level roadways, e.g., a freeway. A problem occurs, however, when maneuvering the vehicle over more uneven surfaces, e.g., through parking lots, over traffic bumpers and curbs and the like. The bags only allow limited angular deflection of the axles and when the roadway surface variation demands more than what is permitted (as often it will), a severe twisting force is exerted on the frame and body. Twisting of the frame and body is avoided only if the frame is sufficiently strong to withstand the cantilever effect of shifting all of the weight to three of the wheels, e.g., with the fourth wheel literally lifted off the roadway. The stress applied to the body and frame are great and to protect the body and frame from twisting, the structure has to be made substantially stronger resulting in added weight and added cost of construction.

BRIEF DESCRIPTION OF THE INVENTION

The present invention avoids the need for increased strength of the frame and body and yet increases the comfort as compared to the typical structure described above. There are several factors that combine to effect the undesired rocking and they will be discussed in more detail in the description of the preferred embodiment having reference to the accompanying drawings. For this brief description, the reader will gain an appreciation of the invention and the problem it solves by considering only the front wheels having a width about 6 feet (but often wider) and connected by a front axle, the frame rails having a width of about 3 feet and centered between the wheels, and the air bags supported on the axle and under the frame rails.

With the air bags inwardly of the wheels and under the frame rails, when one wheel suddenly becomes lower than the other, e.g., it drops in a hole, the axle positions under both bags are lowered but one more than the other and neither as much as the lower wheel. The front end of the motor home drops and tilts due to the dynamics involved and the undesired rocking or tipping motion takes place but without applying extreme twisting stress to the frame and body.

With the air bags moved all the way out to the body width, i.e., beyond the wheels, now when one wheel is suddenly lowered, the axle support for the bag beyond the upper wheel is slightly raised and the axle support for the bag beyond the lower wheel is slightly lowered more than the lowered wheel. Essentially the front end remains at the same level and the weight of the motor home is shifted to the raised bag and to a lesser extent to the rear bags. The motor home incurs very little rocking. However, whatever the axle deflection, it has to be accommodated by expansion of the lower air bag. There is a limit of expansion/contraction of the air bags and if that limit is exceeded, the bag will pull down on the frame rather than lift the frame and the result is an increased twisting force applied to the frame and body.

Applicant has designed a system that is a compromise of the above two systems. The bag supports are moved outwardly toward the wheels to minimize any drop off of the upper front bag. Thus, the upper bag assumes a greater load and retains the support substantially at the same height. The rocking is not totally eliminated but to a far greater extent than the typical design. The positioning of the bag is calculated so as to locate the bag sufficiently inward from the wheels to allow for normal axial deflections, e.g., as may be encountered when going over speed bumps in a parking lot.

Little added cost is incurred as the frame and body need not be reinforced and yet the rocking that is undesired when simply locating the bags at the frame rails is significantly reduced. These and other advantages will be made apparent by reference to the following detailed description which follows.

BRIEF DESCRIPTION OF THE DRAWINGS

FIG. 2 is a top plan view of the chassis only showing the outline of the motor home body in dash line and showing the wheels and certain axle portions also in dash line;

FIG. 3 is a side view of the chassis of FIG. 1;

DESCRIPTION OF THE PREFERRED EMBODIMENT

Figure 1:
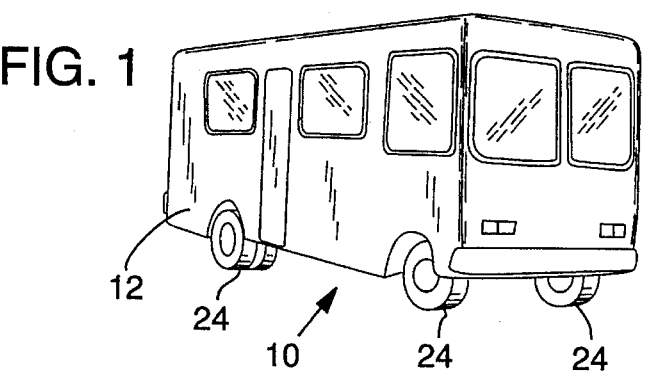
FIG. 1 is a general view of a motor home supported on a chassis, only the wheels of which are apparent from the figure.

FIG. 1 illustrates a motor home that utilizes the air suspension system of the present invention. Typically the motor home is outfitted with equipment and furnishings to provide all the comforts of home. To provide all of these comforts, the motor home is configured to maximize the inside room including in particular the height and width. As will be noted, the side walls extend beyond the wheels and the height, as previously indicated, may exceed ten feet. The wide/high configuration provides the desired room but creates some problem in traveling. The body of the motor home is not adapted to twisting and even more so than in an automobile, it is important to prevent twisting that can occur, e.g, when engaging bumps or holes in the road. These twisting type actions are avoided by the interjection of a suspension system between the wheels and the body. Whereas a good suspension system will minimize the twisting force being applied to the body, that same suspension system will create rocking or swaying of the motor home as it travels down the highway, e.g., as compared to an automobile. Such swaying and rocking is uncomfortable and also can affect operator control. Accordingly, users of a motor home desire that the motor home will have a suspension system that will provide a smooth comfortable ride and will minimize swaying or rocking as the motor home encounters the normal gyrations of road travel. It is an objective of the present invention to provide an air suspension system for a motor home 10 which accommodates the twisting forces while also minimizing the rocking and swaying action. A second objective is to minimize the effect of tipping forces as when rounding curves or exposed to high winds. Such tipping may not create the same structural concerns but can have an effect on comfort and safety.

FIG. 2 indicates in outline the body 12 of the motor home and otherwise illustrates the chassis which provides the support for the body 12 and includes all of the components which make a motor home mobile. The chassis as shown in FIGS. 2–5 includes a frame 14 having parallel elongated beams 16 interconnected by cross beams 18. The beams 16 are, e.g., spaced 3 feet apart and the body 12 of the motor home is, e.g., 8 feet wide. The body side edge is positioned about 2½ feet out from each of the beams 16 of the frame as illustrated in FIG. 2. The frame 14 is rigidly and securely attached directly to the body. For all intents and purposes, whatever twisting or turning takes place in the frame, that same twisting is applied to the body.

The frame 14 is carried or supported on a front axle 20 and a rear axle 22, by having a suspension system interjected between the frame and axle which will be hereafter specifically described. The axles 20, 22 have wheels 24 mounted at the ends (but inside the body side edges 12) as illustrated in FIG. 2. The rear wheel axle 22 is driven by an engine drive shaft (the engine and drive shaft being part of the chassis but not shown) which is connected to the axle 22 through the rear differential 26.

The suspension system will now be explained. The suspension system is substantially a plurality of air bags 28 (of conventional design) sandwiched between an upper or frame support assembly and a lower or axle support assembly.

Figure 4:
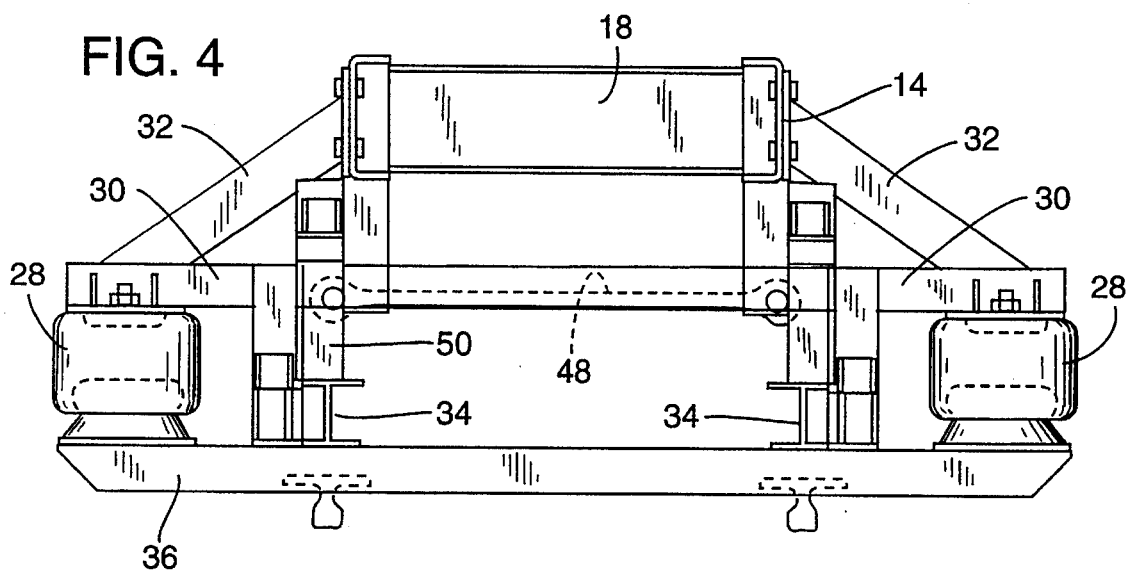
FIG. 4 is a front end view as taken on view lines 4—4 of FIG. 2.

Reference will be first made with respect to the front end structure as illustrated in the left side of FIGS. 2 and 3 and in FIG. 4. The upper or frame assembly includes a pair of cross beams 30 extending the width of the bag positions and thus substantially beyond the width of the frame. The cross beams 30 are rigidly secured to the frame 14 through angled supports 32. Underlying the upper or frame assembly is the lower or axle support assembly which includes lengthway braces 34 and cross braces 36. Braces 34 are secured to the top of the axle 20 (see FIG. 3), e.g., by welding. Bags 28 are positioned under the laterally extended ends of cross beams 30 (attached to the frame) and over the laterally extended ends of cross beams 36 (attached to beams 34 which are attached to the axle 20). To insure that the axle 20 does not rotate about its longitudinal axis, a bracket 40 extends down from frame 14 and a bracket 42 extends up from lengthway braces 34 and connecting rods 44, 46 are partially connected in parallel between the brackets 40, 42 as seen in FIG. 3. The connections permit pivoting of rods 44, 6 at their bracket connections and allows limited relative vertical movement as between the frame and axle but prevents rotation of the axle. A further rod 48 is connected between the cross bar 30 and a bracket 50 extended upward from lengthway brace 34 (as seen in FIG. 4). The rod 48 also permits limited vertical movement but it prevents side shifting of the frame relative to the axle.

Figure 5:
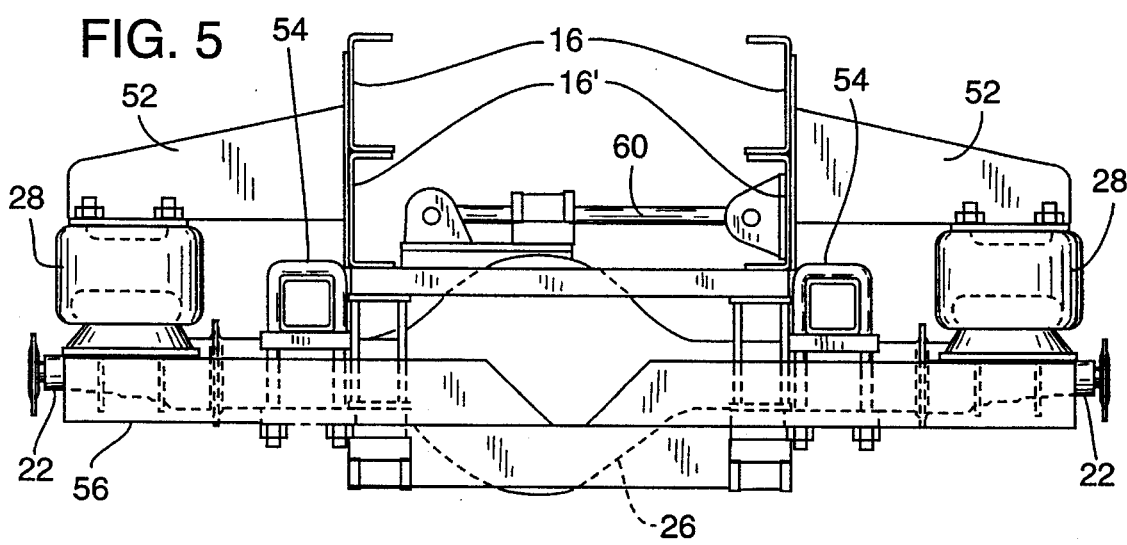
FIG. 5 is a rear end view as taken on view lines 5—5 of FIG. 20

Reference is now made to the rear end structure as illustrated in the right side of FIGS. 2 and 3 and in FIG. 5. It will first be noted from FIG. 3 that the frames elongate beams 16 are extended rearward of the rear axle by attachment of extender beam 16'. In the area of the rear axle 22 the beams 16 and 16' are overlapped as also apparent from FIG. 5. Brace members 52 extend laterally from the beams 16, 16' to a position overlying the positions of rear bags 28, i.e., at each side and forward and rearward of the axle 22. Brace members 52 provide the same function as the cross beam 30 and angle beams 32 of the front end upper support assembly. The lower or axle support assembly at the rear axle includes lengthway braces 54 and crossway braces 56. The axle 22 is secured to the length way braces 54. A rod 58 pivotally connected between the frame and axle 22 retains the pivotal orientation of the axle 22 and rod 60 pivotally connected between the frame elongate beam 60' and the axle (or its support member) prevents side shifting.

Certain of the support brackets and braces are not described herein in detail. Those skilled in the art will appreciate the need for such additional support structure and the description here will not be burdened with such additional detail.

The description will now turn to the invention as incorporated into the structure as described. As is now apparent, the upper and lower support assemblies have provided the necessary apparatus to establish a customized location for the air bags 28. Where previously a total of four air bags were provided at a position whereat each axle 20, 22 crossed under the elongate beams 16 of frame 14, the support assembly components of the above-described apparatus can be sized and configured in any desired manner to place the air bags 28 at any desired lateral position. As will be most apparent from FIG. 2, the bag positions are substantially at the inner side of wheels 24 and both the front and rear bags are at the same position laterally.

Whereas the assembly support structures are important to achieve a desired location of the bags, equally important is the process of determining the desired location of the bags.

The determination of the bag locations is dependent on a number of factors. The bags are designed to produce a determined amount of expansion and contraction, i.e., the bags include limits of expansion and contraction. When these limits are exceeded, a mechanical connection is engaged and further expansion or compression of the bag, or alternatively, further relative movement of the axle and frame in the bag areas, is prevented.

It is desirable not to exceed the limits of expansion of the bag. Upon exceeding the expansion limits, the bag and underlying axle and wheels are no longer supporting the frame and the overlying body. The weight of the body is at this point supported by a cantilever action and a bending force is applied to the frame and body. This bending force is to be avoided.

The desired location for the air bags is therefore at a widest position where deviation in the road surface under the wheels does not exceed the expansion limit of the air bags. Consider for example that an air bag will provide adequate support in a range of four inches from being normally compressed (with the motor home on a level surface) to being fully expanded, i.e., the point beyond which the expanding force of the bag no longer supports the weight of the motor home (e.g., caused when one of the wheels drops onto a surface lower than the other wheels). If that limit is exceeded, the weight of the vehicle is supported on three wheels (the rear dual wheels each being considered one wheel) and a substantial portion of the weight of the motor home is supported in a cantilever fashion, i.e., the frame (or overlying body structure) becomes a cantilever and the rigidity of the frame overhanging the three wheel support has to resist a severe bending force.

With the air bags under the frame, e.g., two feet in from the wheels which are spaced six feet apart, one of the wheels, e.g., the left front wheel can drop into a six inch hole, and the front axle (and its support assembly) accordingly is tilted under the bags. The position of the axle under the left front bag drops down about four inches, and under the right front bag it drops down about two inches. The front end of the body and frame drops down at least the two inches whereat the right front bag is located and the required expansion of the left front bag is merely two inches.

Now consider the results if the bags are moved out to the full width of the wheels. If the same six inch hole is encountered, the axle portion under the right front bag doesn't drop at all and the axle under the left front bag drops the full six inches. The front end of the motor home stays in the same position and the left front bag is expanded six inches, two inches beyond its maximum.

Finally, consider moving the bag position to an intermediate position, i.e., one foot inside each wheel. The axle under the right front bag drops down one inch and so too does the front end of the motor home. The axle under the left front bag drops five inches but only four inches below the frame (the frame having been lowered one inch), i.e., the limit of the bag expansion.

The most desirable ride condition is the second example where the front end stays level. The least desirable ride condition is the first example where the front end drops two inches. However, the second example creates a severe and potentially damaging strain on the frame and body. Unless the frame and body are reinforced so as to withstand such a strain, the second example is not a viable option.

The last example as will be appreciated provides a more desirable ride condition without the risk of damage to the frame/body structure. Finding the best solution is a matter of (a) determining the maximum road surface deviation that the motor home will be expected to accommodate, (b) determining the maximum expansion distance that the air bag can accommodate, and (c) the wheel width. The ratio of the distance between the bags to the distance between the wheels is the same as the ratio of the maximum stroke of the bags to the maximum road deviation. A formula can then be derived as follows:

DB=distance between bags
DW=distance between wheels
RD=road deviation
MS=maximum stroke of bags
Thus, $$\frac{DB}{DW} = \frac{MS}{RD}$$

$$DB = \frac{MS \times DW}{RD}$$

Applying the conditions previously discussed:
MS=4 inch
DW=6 feet or 72 inches

RD=6 inches $$DB = \frac{4 \times 72}{6} = 48" \text{ or } 4'$$

Because the bags are centered between the wheels which are six feet apart, the bags are placed one foot in from each wheel.

Applying a new set of conditions:
MS=4 inches
DW=7 feet or 84 inches
RD=5 inches $$DB = \frac{MS \times DW}{RD}$$

$$DB = \frac{4 \times 84}{5} = 67.2 \text{ inches}$$

The distance in from each wheel is:
84−67.2=16.8÷2=8.4 inches

It will be appreciated that the right front bag will drop one-half inch and the left front bag will drop four and one-half inches. The stroke of the left front bag would thus be four inches. This compares to a three foot spacing between the bags for the same wheel spacing (e.g., assuming the frame is three feet in width and the bags are positioned under the front beams) where the right front bag will drop about one and one-half inches and the left front bag would drop three and one-half inches. The stroke of the left front bag would thus be two inches. As will be seen, in the latter event the bags are under utilized assuming that a motor home will not normally be driven over road conditions where the road deviation exceeds five inches.

Many other force factors may influence the effect on bag stroke and ride comfort. The momentum of the motor home when engaging road deviations will have some affect. When exceeding the stroke of the bag, the mechanical connection will require that the frame and body actually lift the affected wheel off the ground adding even further twisting force to the frame and body. All of these factors will be appreciated by the person skilled in the art. The knowledge added by this invention is that riding comfort can be increased without risking frame and body damage by providing a bag support structure that enables the bag to be moved outwardly of the frames so as to locate the bags at an outward position that more fully utilizes the permitted or maximum stroke of the bags without exceeding that maximum stroke. As previously explained, such outward location of the support bags also reduces the effect of the tipping forces, e.g., when rounding a curve in the road or driving in high wind conditions.

Those skilled in the art will be able to apply the invention to numerous variations and modifications of the herein disclosed preferred embodiment. Such variations are considered to be encompassed within the scope of the invention as determined by the claims appended hereto.

I claim:

1. A motor home having an air bag suspension system comprising:

a body having a length, width defining body sides and an underside, a frame having a pair of elongated beams extended along the length of the body and fixed to the underside of the body substantially inward of said body sides, wheels and a front axle and a rear axle each extended laterally of the body between a pair of the wheels, and a suspension system interposed between the front axle and the frame and between the rear axle and the frame, each said suspension system comprising an upper support assembly and a lower support assembly, said upper support assembly fixed to the frame and having an upper arm portion extended laterally outwardly of each of said beams toward the side of the body to a determined bag supporting position, said lower support assembly rigidly fixed to the axle and having at each side a lower arm portion extended under the upper arm portion of the upper support assembly, said lower arm portion through its rigid connection to the axle maintaining a fixed angular relation relative to said axle, and a compressible and expandable air bag positioned between the arm portions of the upper and lower support assemblies at the determined bag supporting positions at each side of the frame, said bag supporting positions located between the body sides and the frame beams as determined by the bag support capabilities in relation to a maximum road deviation to be encountered by the motor home wheels.

2. A motor home as defined in claim 1 wherein:

each of the assemblies include a pair of upper arms, and a pair of lower arms underlying said pair of upper arms at each side of the body, said arms defining a pair of supports for air bags forward and rearward of each wheel and air bags positioned therebetween.

3. A motor home as defined in claim 2 wherein the bag positions are determined by establishing the maximum bag expansion, determining the maximum road deviation to be accommodated by the motor home, and then establishing a ratio as between the lateral spacing of the bags and the lateral spacing between the wheels that substantially equals the ratio of the maximum bag expansion to the maximum road deviation.

* * * * *